2,698,892
METHOD OF PRODUCING WELDED MOLYBDENUM

Roy I. Hardin, Chicago, Ill., assignor to Fansteel Metallurgical Corporation, North Chicago, Ill., a corporation of New York No Drawing. Application December 29, 1950, Serial No. 203,547

1 Claim. (Cl. 219—10)

This invention relates to a weldable molybdenum and method of preparing the same so that the molybdenum is susceptible to arc welding to provide crack-free butt welded joints.

Molybdenum, because of its refractory nature, cannot be prepared by common metallurgical smelting practices and is conventionally prepared by powder metallurgy methods and by a vacuum arc casting method. In the conventional powder metallurgy method, powdered molybdenum is pressed in a die and the pressed bar then sintered in hydrogen or in a vacuum. The bar or ingot thus prepared is limited in size. In the vacuum arc casting method, the molybdenum powder is pressed into a bar and the pressed bar employed as an electrode. This pressed bar becomes melted in a vacuum. By this vacuum casting, somewhat larger ingots may be obtained. However, this method also produces ingots or bars of a relatively small size as compared to ingots which may be formed of the more commonly used metals. The bars or ingots produced by powder metallurgy methods and by the vacuum casting method are subsequently mechanically worked as by rolling to produce sheet molybdenum. The size of molybdenum sheet is necessarily limited because of the limited size of the initial bars or ingots.

Because of the refractory nature of the metal, its use for various high temperature applications is highly desirable. The fabrication of various structural shapes has been deterred because of the inability to weld molybdenum to form the desired shape or to form larger sheets of material. Because of the high affinity of molybdenum for oxygen, some of the commonly used welding methods are necessarily excluded. The use of inert atmospheres must be employed to protect molybdenum from oxygen containing atmospheres.

It has been impossible to fabricate molybdenum by the usual arc welding techniques although by inert gas welding techniques the molybdenum may be satisfactorily protected from oxidation. The weld produced is brittle and the weld cracks upon cooling. For example, in the welding of molybdenum sheet, the edges of the molybdenum are placed in abutting relationship and held in such position by mechanical means. The area immediately overlying the electrode is supplied with the inert gas and an arc initiated between the electrode and the abutting edges. The electrode is then advanced along the abutting edges or the sheet is moved with respect to a fixed electrode. The weld thus produced is always brittle. Invariably the metal which has been melted cracks upon cooling and the crack follows the progress of the arc.

The principal purpose of the present invention is to provide a method of fabricating molybdenum so that the resulting product may be arc welded.

A further object of this invention is to provide a new molybdenum product which is readily susceptible to arc welding in an inert atmosphere with such welds free from cracks after the joint has been cooled.

Other objects and advantages of this invention will become apparent from the description and claim which follows.

I have discovered that molybdenum may be butt welded if the sheet molybdenum has been produced from molybdenum powder to which has been added certain small and limited amounts of carbon.

As stated hereinbefore, there has been no method known whereby conventional molybdenum sheet can be fabricated by a welding method. Commercial grade molybdenum sheet generally contains in the neighborhood of 0.005% carbon and in all cases does not contain more than about 0.01% carbon. Attempts to fabricate this commercial molybdenum by butt welding results in a cracking of the weld upon cooling and the crack follows the progress of the arc.

Molybdenum sheet formed from ingots or bars prepared from a mixture of molybdenum powder and small and limited amounts of finely divided carbon may be satisfactorily fabricated by butt welding in an inert atmosphere. The molybdenum sheet for such fabrication contains from about 0.02% to about 0.09% total combined carbon, preferably from about 0.03% to about 0.05%. Fabrication of molybdenum sheet containing combined carbon within this range may be satisfactorily effected by butt welding without encountering the normal cracking of the weld upon cooling. In preparing the mixture of molybdenum powder and finely divided carbon, the amount of carbon added must be sufficient to provide the ingot or bar with the required amount of carbon.

The carbon may be incorporated in the molybdenum by adding the carbon to the molybdenum powder in the form of finely divided carbon such as lamp black. The powders are thoroughly and intimately mixed as by a ball milling operation. The specific amount of carbon which is added to and mixed with the molybdenum powder will be dependent upon the amount of carbon desired in the ingot and finished sheet. In all cases the amount of carbon which is added to the molybdenum powder should be sufficient to provide the molybdenum sheet with from about 0.02% to about 0.09% total combined carbon.

It appears that during the welding operation, the carbon must be present in the molten metal or must be released in the molten metal in the form of elemental or atomic carbon in order to eliminate cracking of the weld upon cooling. In adding carbon as finely divided carbon, it becomes absorbed by or reacts with the molybdenum during the sintering operation to form a solution of carbon in the molybdenum or molybdenum carbide. During the welding operation the carbon is apparently released from the solution or molybdenum carbide and is free to react with oxygen or other constituents which normally cause the cracking of the weld metal upon cooling. This explanation is merely set forth as a possible theory because the presence of carbon as free carbon does not eliminate the cracking of the weld metal upon cooling.

Molybdenum bars or ingots, for example, may be prepared by powder metallurgy methods. An intimate mixture of molybdenum powder and carbon is formed by adding the finely divided carbon such as lamp black or air spun graphite to the molybdenum powder and subjecting the mixture to a ball milling operation. The addition of about 0.1% carbon to the molybdenum powder will result in the production of finished sheet containing between about 0.025% and about 0.03% combined carbon. After thoroughly mixing the molybdenum powder and carbon, the powder mixture is placed in a desired die and subjected to sufficient pressure to form self-supporting bars or billets. The bars or billets are subsequently sintered in a hydrogen atmosphere. The resulting molybdenum ingot or bar is then mechanically worked in accordance with conventional practices to produce sheet form of the desired thickness. The sheet form molybdenum containing the combined carbon is fabricated into large sheet form or into desired shapes by placing edges of the sheet form molybdenum in abutting relationship and by welding in an inert atmosphere such as argon or helium, preferably by the use of a tungsten or other inert welding electrode.

I claim:

The method of producing fabricated molybdenum characterized by crack-free butt welds which comprises the steps of forming ingot molybdenum from an intimate mixture of molybdenum powder and a small amount of added carbon, the amount of added carbon being sufficient to provide the ingot molybdenum with from about 0.02% to about 0.09% carbon, mechanically working the ingot molybdenum into sheet form molybdenum, positioning edges of such sheet form molybdenum in abutting relationship and arc welding the abutting edges in the presence of an inert atmosphere.

References Cited in the file of this patent

UNITED STATES PATENTS

| | | |
|---|---|---|
| 1,054,005 | Lederer | Feb. 25, 1913 |
| 1,605,071 | Ronci | Nov. 2, 1926 |
| 2,491,866 | Kurtz | Dec. 20, 1949 |

OTHER REFERENCES

Park et al., pages 1–12 of "The Melting of Molybdenum in the Vacuum Arc," American Institute of Mining and Metallurgical Engineers Technical Publication No. 2052 in Metals Technology, September 1946.

Miller, "Molybdenum," Metal Industry, vol. 75, No. 21, Nov. 18, 1949, pages 439–441.